United States Patent
Tannenbaum

(10) Patent No.: US 11,451,655 B1
(45) Date of Patent: *Sep. 20, 2022

(54) SYSTEM AND METHOD OF USE FOR VEHICULAR OCCUPANT SAFETY

(71) Applicant: Adam Benjamin Tannenbaum, Ashdod (IL)

(72) Inventor: Adam Benjamin Tannenbaum, Ashdod (IL)

( * ) Notice: Subject to any disclaimer, the term of this patent is extended or adjusted under 35 U.S.C. 154(b) by 0 days.

This patent is subject to a terminal disclaimer.

(21) Appl. No.: 17/319,320

(22) Filed: May 13, 2021

(51) Int. Cl.
*H04M 1/72421* (2021.01)
*H04W 4/48* (2018.01)
*H04W 4/029* (2018.01)
*H04W 76/50* (2018.01)

(52) U.S. Cl.
CPC ....... *H04M 1/72421* (2021.01); *H04W 4/029* (2018.02); *H04W 4/48* (2018.02); *H04W 76/50* (2018.02)

(58) Field of Classification Search
CPC ... H04M 1/72421; H04W 4/029; H04W 4/48; H04W 76/50
See application file for complete search history.

(56) References Cited

U.S. PATENT DOCUMENTS

| | | |
|---|---|---|
| 5,802,479 A | 9/1998 | Kithil et al. |
| 5,848,802 A | 12/1998 | Breed et al. |
| 6,026,340 A | 2/2000 | Corrado et al. |
| 6,028,509 A | 2/2000 | Rice |
| 6,051,981 A | 4/2000 | Gershenfeld et al. |
| 6,104,293 A | 8/2000 | Rossi |
| 6,166,625 A | 12/2000 | Teowee et al. |
| 6,275,146 B1 | 8/2001 | Kithil et al. |
| 6,335,687 B1 | 1/2002 | Terashima et al. |
| 6,480,103 B1 | 11/2002 | McCarthy et al. |
| 6,768,420 B2 | 7/2004 | McCarthy et al. |
| 7,348,880 B2 | 3/2008 | Hules et al. |
| 9,760,827 B1 * | 9/2017 | Lin .......................... G06N 3/08 |
| 9,998,899 B1 * | 6/2018 | Tannenbaum ..... G08B 21/0269 |
| 2004/0095252 A1 | 5/2004 | Kraljik et al. |
| 2004/0155783 A1 | 8/2004 | Al-Sheikh |

\* cited by examiner

*Primary Examiner* — Minjung Kim
(74) *Attorney, Agent, or Firm* — Robert Brownstein

(57) ABSTRACT

The invention is a system and use method for providing safety to living occupants inside a closed, locked vehicle, such as a child or a pet left inside, or a driver who has become incapacitated after parking but while still inside the closed, locked vehicle.

4 Claims, 5 Drawing Sheets

SYSTEM AND METHOD OF USE FOR VEHICULAR OCCUPANT SAFETY

TECHNICAL FIELD

The present invention relates to vehicular safety systems.

BACKGROUND OF THE INVENTION

A recurring problem that occurs most often during hot or severe cold weather is when a child or pet is left in a closed vehicle while the driver tends to some other matters. Closed vehicles can quickly heat up, or cool down, to temperatures that are unsafe for humans and other animals. Sometimes the driver leaves the child or pet in the closed vehicle intending to be away for only a short time, but then it takes longer than anticipated. Other times preoccupied drivers forget the child who is strapped into a safety seat in the back seat area, or the sleeping pet lying on the seat or floor. In any case, it is not safe to leave a child or pet in a closed vehicle for more than a few minutes. A safety system that could prevent such situations, or prevent tragedy when such situations occur, could save many lives of children and pets each year.

Another type of problem is one where the driver becomes incapacitated after safely pulling a vehicle to the side of a road or highway and has placed the vehicle in "park," which is a neutral gear with transmission locked. A safety system that can detect that situation and take steps to secure help could also prevent injury and/or loss of life.

BRIEF SUMMARY OF THE INVENTION

The system for vehicular occupant safety system is an apparatus comprising the following subsystems: a programmable processor, an input/output (I/O) subsystem, at least one sensor capable of detecting motion and/or infrared energy and/or carbon monoxide levels, an electronic camera, a GPS receiver, memory, cellular radio, and vehicular engine and accessory control.

The system and its program or programs provide a means of detecting a living occupant left inside a closed vehicle where no driver is present; or a driver who is incapacitated. This sets in motion an escalating set of responses, where an occupant is left inside, that first attempt to get the driver, through pulsing of the horn and flashing the hazard lights, to return to the vehicle and alleviate the situation. If that succeeds, the system goes into standby mode. If not, the system then determines the vehicle location and places calls to a hierarchical list of telephone numbers and to a first-responder/emergency telephone number. In addition, the system uses cellular access to the Internet to invoke a mobile-device application that gives the recipients of an incoming emergency message several options for remote control of the situation in the vehicle. However, in the absence of a control action via the application, the system will follow its programmed response. While waiting for help to arrive, the system continues by monitoring temperature and carbon monoxide levels inside the vehicle and selectively opening or closing windows, and turning on or off the engine and operating air-temperature-control accessories. In the case of an incapacitated driver, the system will take similar actions but does not activate the horn and only flashes the lights.

DESCRIPTIONS OF THE DRAWINGS

DETAILED DESCRIPTION OF THE INVENTION

Figure 1:
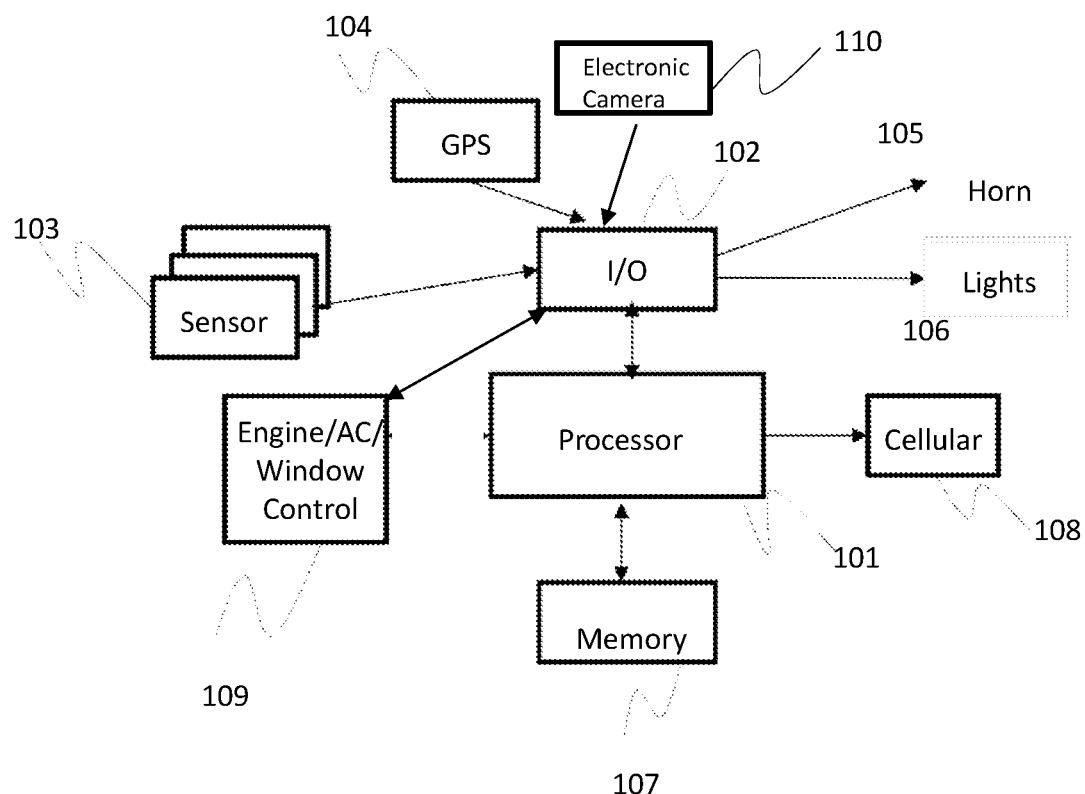
FIG. 1 depicts a vehicle occupant safety system and the subsystems it comprises.

Each year during hot weather seasons, one learns about children or pets left in closed, locked vehicles. The situation often ends in tragedy for the child or the pet because a closed automobile can reach temperatures well above 120 degrees F. and result in near-death or death. In a similar way, children or pets left in a vehicle in severe cold weather are also at risk of injury or death.

It can happen that a driver, feeling ill, may pull over to the side of a road or highway, place the vehicle in "park" (e.g. neutral with locked transmission), and then lose consciousness. With the engine still operating, the occupant may be overcome by exhaust gases (e.g. carbon monoxide). If the weather is very hot or very cold, the unconscious driver may suffer the effects of heat- or cold-related traumas.

The system herein disclosed and claimed detects the presence and position of a living occupant in a closed car; or the presence of an unresponsive driver; and by executing at least one program, it can initiate a sequence of escalating responses aimed at protecting the life of a child, pet or unresponsive driver.

The system (FIG. 1) comprises the following subsystems: a programmable processor (101); an I/O subsystem (102); at least one sensor (103) operative to detect motion, infrared energy, temperature and carbon monoxide levels in the vehicle; a GPS receiver (104); a memory subsystem (107); a cellular radio (108) capable of calling stored telephone numbers and, via Internet access, invoking an application launch in selected mobile devices; a vehicle engine/accessory control subsystem (109) and an electronic camera (110) that is focused on a driver via the rear-view mirror. The I/O subsystem is operative to receive sensor and GPS location information and convey that to the processor. The I/O subsystem is also operative to receive input from the processor and to pulse the vehicle horn (105) and flash its hazard lights (106). The cellular radio subsystem is operative to receive at least one telephone number from the processor and to place a call, detect an answer, convey a voice synthesis emergency message and provide vehicle location information. The cellular radio is also operative to access the Internet via cellular connectivity and to invoke the launch of a mobile-device application. The vehicle engine/accessory control subsystem is operative to turn on and off the vehicle engine while locking the vehicle in park, and to turn on and off air-temperature-control accessory systems. And, the electronic camera is operative to detect a driver's image in the rear-view mirror so as to determine whether a driver is present, or, if a driver has become incapacitated.

In the situation where a child or pet may be left inside a closed, locked vehicle, the system is operative to detect a driver's presence or absence in the driver's seat. This will hereinafter be called a "driver present event" and a "driver absent event." It is also operative to detect the presence and position of any living occupant in the vehicle. The system is ordinarily in standby mode until the occurrence of a driver absent event. Following such an event, the system attempts to detect signs of life, using motion and/or infrared, and the location of all living occupants. If a living occupant is positioned in the driving position, the system reverts to standby. If, however, the driving position is unoccupied but at least one living occupant is detected, the system will start a timer and monitor elapsed time. Should the elapsed time exceed a preset limit, the system will begin pulsing the horn and flashing the hazard lights until a door event occurs and either the driver position is now occupied by a living occupant, or there are no living occupants remaining in the vehicle.

This first response is meant to alert a driver while he/she is still near the vehicle. The system may offer a time delay button option that will extend the preset time. Thus, a driver may extend the time before exiting the vehicle, or after returning to it following the horn/light response. In no case, however, will the time extension be long enough to endanger the living occupants of a closed vehicle before the onset of a horn/light response. Ultimately, the system will only revert to standby once a driver present event is detected; or a driver absent event occurs and no living occupants are detected within the vehicle. Absent those two conditions, the horn continues to pulse and lights continue to flash until a preset time limit has elapsed. After that time limit has elapsed, the horn pulsing ceases but hazard light flashing continues. The system then progresses to a second response (e.g. response 2).

Figure 2:
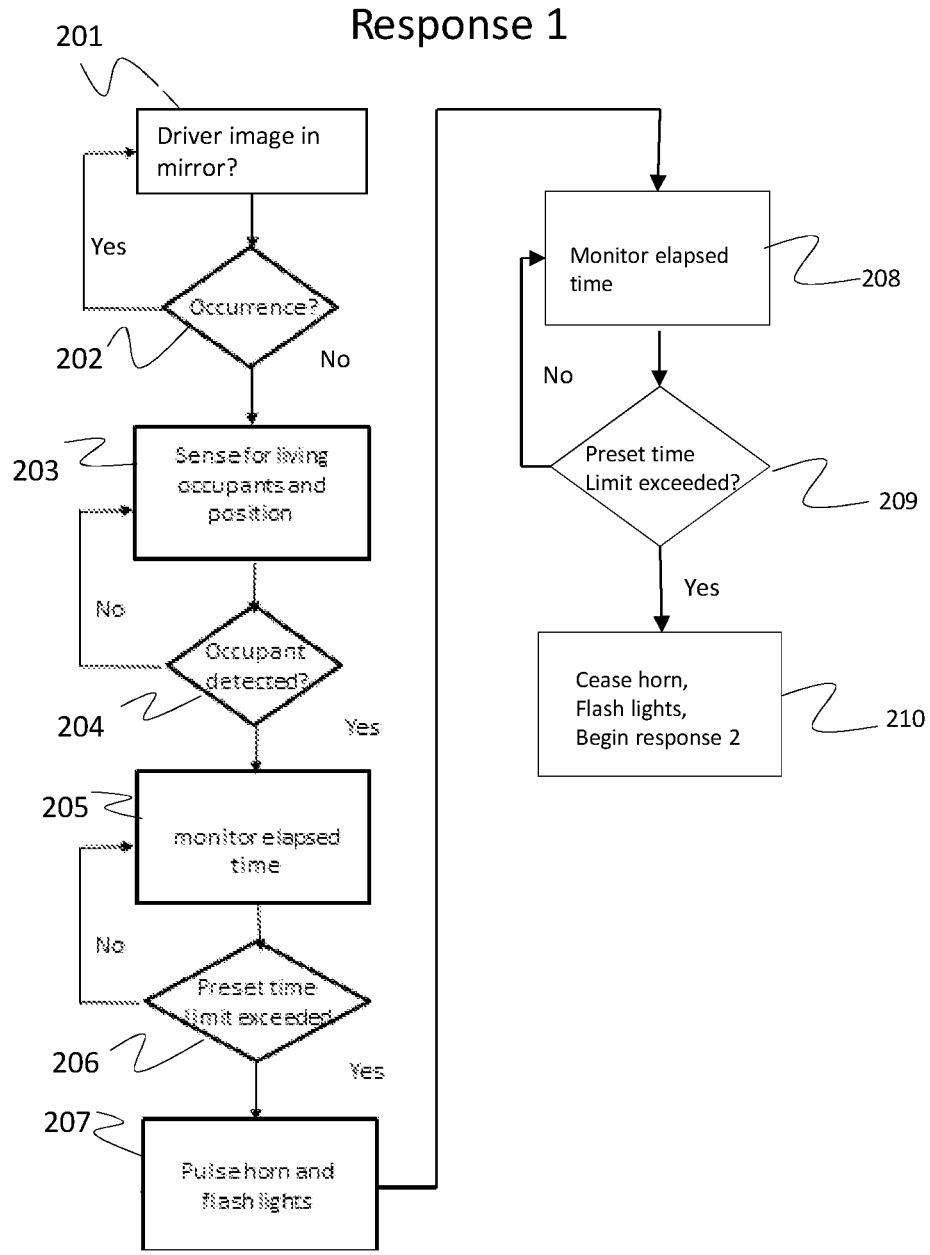
FIG. 2 depicts an exemplary flow diagram of a first response-mode sequence.

FIG. 2 shows an exemplary flow diagram for the basic response mode. The system is programmed to monitor for a driver absent event (201). If no driver absent event is detected, it continues to monitor and if a driver absent event is detected (202), the system detects via its sensor or sensors if there are any living occupants in the vehicle and the position of same. If no living occupants are detected, or the driver position is occupied, the system reverts to standby whereby it continues to monitor for living occupant presence. If occupants are detected (204) and the driver position is unoccupied, the system starts a timer (205) and monitors elapsed time against a preset time limit. Should the preset time limit be exceeded (206), the system begins pulsing the horn and flashing the hazard lights (207) and continues to do so while monitoring for a driver absent or present event. A driver absent event followed by either no further detection of living occupants in the car, or someone subsequently occupying the driving position, will cause the system to revert to standby. Otherwise, in the absence of a subsequent driver present event, the system continues to pulse the horn and flash the lights, and monitor elapsed time (208) until another preset time limit has been exceeded (209). Here, the system ceases pulsing the horn, continues flashing the hazard lights, and progresses to a second response (e.g. response 2).

Figure 3:
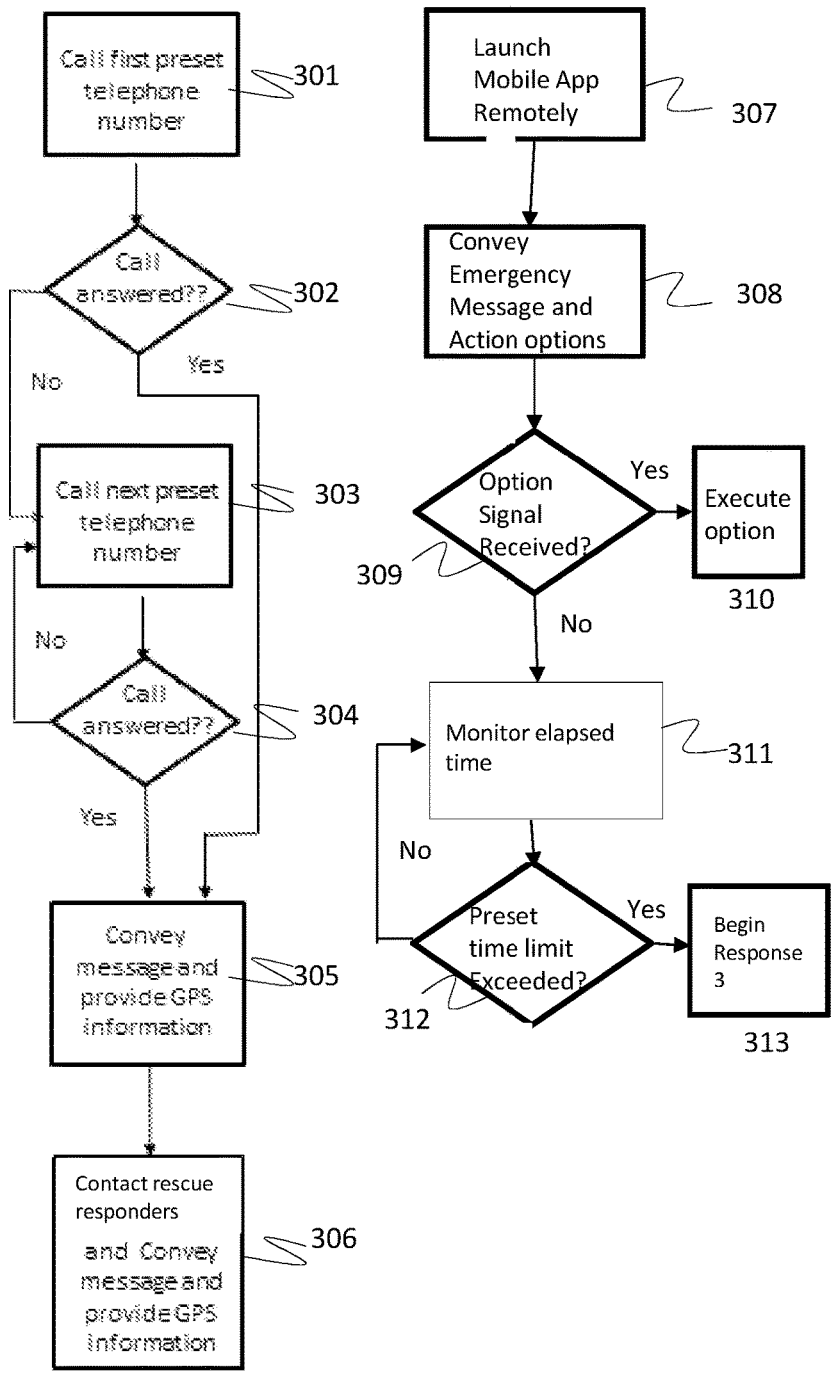
FIG. 3 depicts an exemplary flow diagram of a second response-mode sequence.

Response 2 (FIG. 3) begins two concurrent flows. In one flow (301), a call is then placed starting with the first of a hierarchical list of telephone numbers (302). In order of hierarchy, if a number returns a busy signal or goes unanswered, the system hangs up and calls the next number (303 and 304). If a number is answered the system (304), using voice synthesis, conveys an emergency message and the vehicle's current GPS position (305). To determine if the answered call was by a person or machine, the system requests a key pad digit be pressed (not shown). If the digit is pressed, no further calls are made to the list. If the digit is not pressed, the numbers are called in succession until a call is answered and a confirmation key pad tone is received. In addition to the listed numbers, the system also contacts national rescue responders (306) and conveys the emergency message and vehicle location information. In a concurrent flow, the system uses its cellular radio connectivity to access the Internet and invoke a selected mobile-device application on a list of specific users (307). The application conveys vehicle location, an emergency message, and an opportunity to control aspects of the system response by the first user who takes action (308). If a recipient returns an option signal (309), then the system will execute the selected option (310). While awaiting an option signal, the system monitors elapsed time (311) and if a preset time is exceeded (312), the system begins a third response (e.g. response 3). The system, however, does not relinquish its response actions. While the system awaits the arrival of help, it takes steps to safeguard the occupant(s) of the vehicle. Interior temperature and carbon monoxide levels are frequently monitored. So long as temperature and carbon monoxide levels are safe, no actions are initiated. However, should temperature rise above or fall below safe levels, the system in a closed-loop mode will take whatever steps, such as turning the car engine on or off (locked in park), further opening or closing windows, increasing ventilation fan speed, and the like, to maintain safe temperature and carbon monoxide levels.

Figure 4:
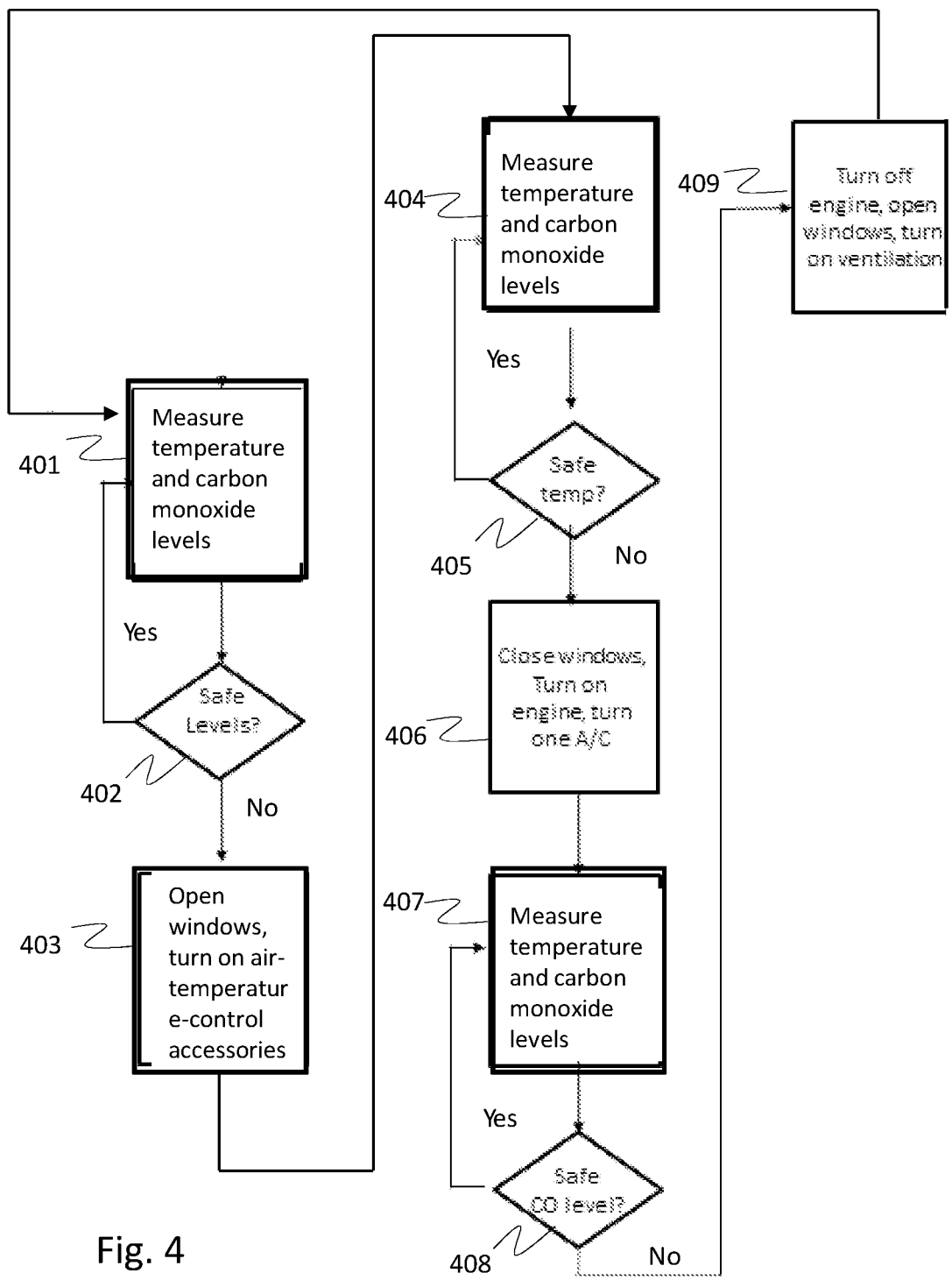
FIG. 4 depicts an exemplary flow diagram of a third response-mode sequence.

FIG. 4 is an exemplary flow diagram showing a sequence beginning with monitoring temperature and carbon monoxide levels (401) against safe-level values (402), then responding by opening windows and turning on ventilation (403). While continuing to monitor temperature and carbon monoxide levels (404) against safe temperature levels (405), the system will, if levels become too cold or too warm (406), close windows and turn on air-temperature-control accessories while continuing to monitor temperature and carbon monoxide (407). If safe carbon monoxide levels are exceeded (408), the system will turn off the engine, open windows, and increase ventilation fan speed (409). This response will continue until help arrives and the system detects a door event followed by a person in driving position or no presence of living occupants. In such case, the system reverts to standby, monitoring for subsequent door events. A reset button may also be located on the system or provided through an application on a mobile device.

Figure 5:
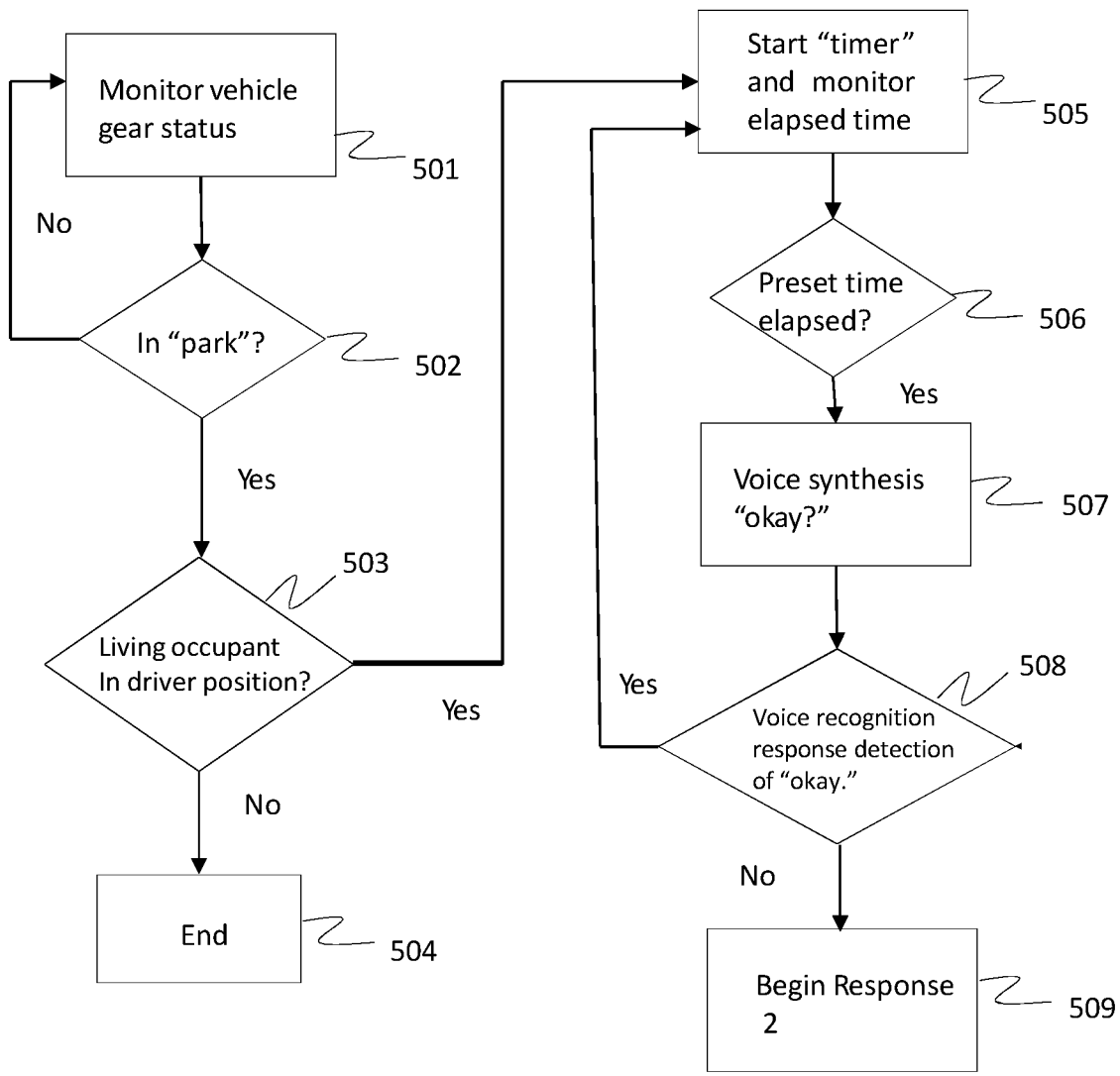
FIG. 5 depicts an exemplary flow diagram of a response-mode sequence for detecting and protecting an incapacitated driver.

FIG. 5 shows an exemplary flow diagram for operations aimed at protecting the life of an incapacitated driver. While monitoring gear status, if the car is in drive, the system just continues to monitor (501 and 502). However, when the system detects the vehicle is in park (e.g. neutral with locked transmission), it detects whether a living occupant is in the driving position (503). If no one is in the car, the program ends (504). This would be the case where the driver parks and exits the vehicle. However, in the case where a driver parks but remains in the vehicle, there is the possibility that the driver is incapacitated. This can be detected by a camera aimed at the rear-view mirror so as to see the driver's reflection. A driver whose head is slumped over, or one whose eyes are detected as being closed would be considered incapacitated. So, when gear and position data indicates a driver in a parked vehicle, a timer is started (505) and monitored for elapsed time. If the preset time limit is exceeded (506), the system using voice synthesis (507) asks if the driver is okay. A voice recognition detection of "okay" will simply reset the timer. No response (508) will start a second response, 509. Following the completion of response 2, if no option signal is received, the system progresses to the third response (e.g. response 3). The system will continue to monitor temperature and carbon monoxide levels and, if necessary, operate engine and accessories to maintain safe levels. If a door event is detected (such as a first responder opening the door and removing an incapacitated driver), the system will subsequently detect no living occupants in the vehicle and revert to standby. In the case where a driver is parked, conscious, and waiting in the vehicle, each time the timer exceeds the third preset time, it will query the driver. After the first such query, a button (not shown) may allow a conscious driver in no need of assistance to put the system in standby mode and stop the timer and subsequent queries. Once the vehicle is restarted and placed in forward or reverse gear, the system will again monitor for a vehicle-in-park with a driver in position.

The system subsystems are shown as discrete subsystems in FIG. 1. However, two or more may be integrated into a single chip or module. In an original-equipment manifestation, the system subsystems may be contained in a dash system. An after-market manifestation could include a system mounted anywhere in the vehicle, vehicle engine compartment or vehicle trunk area.

Sensors having high-resolution motion detection and/or sensors that can detect pinpointed infrared heat signatures can be used for live occupant detection. Any sensor operative to detect an indication of life can be used. Sensor arrangements for detecting position are well known. Sensors for monitoring temperature and carbon monoxide levels are well known. Sensor modules that can detect a multiplicity of temperature, motion, infrared energy, and carbon monoxide could also be used in place of separate sensors.

As original equipment or after-market implementation, it is assumed the system will be powered by the vehicle's battery system. It may, optionally, have its own backup battery and some indication of a need to recharge.

What is claimed is:

1. A method of use comprising:
   detecting a driver absent event as evidenced by image captured by an electronic camera aimed at reflection in a rear-view mirror wherein driver's seat is not occupied;
   detecting a driver present event as evidenced by said image captured by said electronic camera aimed at reflection in said rear-view mirror wherein said driver's seat is occupied;
   sensing presence and position of living occupants with sensors operative to detect motion and body temperature;
   returning to said driver absent event detecting if no living occupants sensed;
   returning to said driver present event detecting if living occupant is in driver position as as evidenced by said image captured by said electronic camera aimed at reflection in said rear-view mirror wherein said driver's seat is occupied;
   starting a timer if living occupant is sensed anywhere inside the vehicle but not in said driver's seat;
   monitoring elapsed time against a first preset elapsed-time limit;
   pulsing of vehicle horn when said elapsed time exceeds said preset first elapsed-time limit;
   flashing of vehicle hazard lights when said elapsed time exceeds said preset first elapsed time limit;
   continuing said pulsing of horn and said flashing of said vehicle hazard lights while monitoring for said driver present event;
   reverting to standby if said driver present event is detected;
   reverting to standby if said driver absent event is detected and no said living occupant is detected.

2. A method of use as in claim 1 further comprising:
   starting a timer concurrently with said pulsing of said vehicle horn and said flashing of said hazard lights;
   monitoring said elapsed time against a second said preset time limit; and
   ceasing said horn pulsing while continuing said light flashing if said second preset time limit is exceeded.

3. A method of use as in claim 2 further comprising:
   calling a first preset telephone number and, if answered, conveying emergency message comprising vehicle description and real-time GPS location data for said vehicle;
   calling a said first preset telephone number and, if not answered or the line is engaged, hanging up and calling the next of a list of preset telephone numbers until said next of a list of preset telephone numbers results in answered call whereupon conveying emergency message comprising said vehicle description and said real-time GPS location data for said vehicle;
   calling an emergency telephone number and, when answered, conveying said emergency message, said vehicle description and said real-time GPS location data for said vehicle;
   accessing Internet service using cellular connectivity and invoking a mobile-device application;
   conveying said emergency message inviting a control option response; and
   receiving via said Internet service any said control option response selected by a mobile-device application user.

4. A method of use as in claim 3 further comprising:
   responding to said control option response.

* * * * *